(12) United States Patent
McCoy et al.

(10) Patent No.: US 6,279,096 B1
(45) Date of Patent: Aug. 21, 2001

(54) DIGITAL SIGNAL PROCESSING MEMORY LOGIC UNIT USING PLA TO MODIFY ADDRESS AND DATA BUS OUTPUT VALUES

(75) Inventors: James Kevin McCoy, Garland; Robert Heflin Frantz, Plano, both of TX (US)

(73) Assignee: Intelect Communications, Inc., Richardson, TX (US)

( * ) Notice: Subject to any disclaimer, the term of this patent is extended or adjusted under 35 U.S.C. 154(b) by 0 days.

(21) Appl. No.: 09/164,965

(22) Filed: Oct. 1, 1998

(51) Int. Cl.[7] ........................................... G06F 12/10
(52) U.S. Cl. .............................. 711/211; 712/226
(58) Field of Search ................... 712/209, 226; 711/202, 211

(56) References Cited

PUBLICATIONS

DeHon, André, Transit Note #118, Notes on Coupling Processors with Reconfigurable Logic, M.I.T. Transit Project, Mar. 21, 1995.*

* cited by examiner

Primary Examiner—Richard L. Ellis
(74) Attorney, Agent, or Firm—Robert H. Frantz

(57) ABSTRACT

The inventive system and method provides a processing resource which performs bit reversing and Boolean algebraic operations. These operations are commonly needed by discrete transform algorithms to reorder data samples. By selectively remapping the address bus, a series of non-linear accesses to the data memory are converted to linear accesses. Another use of the invention to pack floating point numbers in memory is also disclosed. An embodiment using an in-circuit reprogrammable logic device is disclosed which allows processing software to dynamically reconfigure the mapping logic and rules.

3 Claims, 5 Drawing Sheets

Prior Art

DIGITAL SIGNAL PROCESSING MEMORY LOGIC UNIT USING PLA TO MODIFY ADDRESS AND DATA BUS OUTPUT VALUES

TECHNICAL FIELD OF THE INVENTION

This invention relates to high speed processing which requires bitwise data manipulation including reordering of bus data and compound Boolean arithmetic operations. This invention is especially applicable to digital signal processing systems in which address bus and data bus bitwise reordering is necessary to enable such operations as in-place discrete Fourier transforms, packing of floating point memory to reduce bit memory waste, and segmented bitwise operations on data memory.

BACKGROUND OF THE INVENTION

General purpose microprocessor and Digital Signal Processors ("DSP") are well known in the art. Many software algorithms employed on general purpose microprocessor systems use a series of software logical operations to perform bitwise data manipulations, such as a series of read, rotate, XOR, and write instructions. DSP software algorithms to perform discrete transforms such as Fast Fourier Transforms ("FFT") are also well known. In order to conserve memory, which reduces system size, power consumption, and cost, most discrete transforms are executed "in-place" using the same memory area to store to algorithm output as the memory area where the input values are stored.

FIG. 1 shows a simplified butterfly signal flow graph which requires only one complex multiplication, a method commonly used in discrete transform software algorithms. FIG. 2 shows a flow graph of an eight-point Discrete Fourier Transform ("DFT"), in which a problem with in-place execution of such algorithms is evident. If a decimation-in-time ("DIT") decomposition is used by an algorithm, the input data must be stored non-sequentially in linear memory such that the actual memory address where each input data is stored is a "bit reversed" address value of their normal sequential address in order for the algorithm output data to be in sequence in memory. For example, note that input x(4) in FIG. 2 is stored in the second memory address. If one converts the data index of the data value, 4 in this case, to binary, b'100, and performs a bit reversal on that binary value, which is b'001 in this case, the proper "bit reversed" input address is found, which is "1" in base 10. For a further example, note that input x(6), which has a binary index value of b'110, is actually input to the algorithm at memory location b'011, or memory location 3 in base 10.

If an algorithm uses decimation-in-frequency ("DIF") decomposition, the converse is true about the order of the input and output data: input data is input to the algorithm in normal sequential order, and output data is yielded in "bit reversed" non-sequential order.

These phenomena of discrete transforms performed in-place are well known within the art. Many software algorithms and methods have been proposed and used to bit reverse indices into tables, to use look up tables to quickly perform index bit reversal, and to minimize the number of DSP processor cycles needed to resequence input and output data. However, the prior art software algorithm methods incur multiple DSP processor cycles, thereby reducing the effective calculation capability of the DSP. For further understanding of this subject, one could refer to:

(a) "Digital Signal Processing" by Alan V. Oppenheim and Ronald W. Schafer, Prentic-Hall Press, published in 1975; and (b) "Bit-Reverse and Digit-Reverse: Linear-Time Small Lookup Table Implementation for the TMS320C6000", Application Report: SPRA440, by Chad Courtney, Texas Instruments Incorporated, published in May, 1998.

Further, algorithms which use floating point math operations commonly store floating point data in two components, the fractional component or "mantissa", and the radix power or "exponent". If a given processing system is equipped with 16-bit wide data memory, and the floating point math uses the Institute of Electrical and Electronic Engineers ("IEEE") standard 32-bit format having a 23-bit precision on the mantissa and an 8-bit precision on the exponent plus a 1-bit sign, it may be desirable to compress the exponent and mantissa by means of bit extraction and concatenation, into a single 15-bit value such that it can be stored with the sign bit into a single 16-bit wide data memory location. However, this data compression operation when performed in software can require several bitwise extractions, at least one bitwise "OR" operation, followed by a data STORE operation to complete the compression.

Finally, many software algorithms have a requirement to extract a segment or segments of a data word, perform bitwise manipulations such as segment swapping or bit reversing. This requires similar software operations to the compression operation described supra.

Therefore, there exists a need in the art for a system solution to perform data storage order bit reversing without incurring unnecessary CPU calculation cycles in order to maximize the execution throughput of the DSP during discrete Fourier transform operations.

Further, there exists a general need in the processing art to provide a flexible, dynamically reconfigurable bitwise data manipulator to perform bit field and bitwise operations such as bit reversing, bit field extraction, and concatenation.

SUMMARY OF THE INVENTION

The object of the present invention is to provide a processing system solution which performs dynamically reconfigurable bitwise data manipulations, including selectable bit reversal, bit field operations, parallel data and address bus operations, and Boolean algebraic functions.

The invention provides two embodiments, the first of which is a soft programmable logic array ("PLA") in hardware which actively re-maps the memory address and/or data bus signals between the processor and the data memory on a selective basis by type of operation, such as a read or write, by range of memory accesses, and by complete or partial address bus widths. DSP algorithms can designate portions or ranges of memory for which certain bit reversal operations will be performed by the PLA on the address bus signals during a data read or write cycle. This eliminates the requirement for additional processing cycles to be performed explicitly by the software to accomplish the bit reversal operation. The PLA is also available to the microprocessor or DSP for general algebraic functions on the data bus.

The second embodiment disclosed provides a solution based on a specific DSP with an improved CPU, namely the addition of a PLA to one of the arithmetic and logic units with a Texas Instruments TMS320C6x DSP.

BRIEF DESCRIPTION OF THE DRAWINGS

For a more complete understanding of the invention.

DETAILED DESCRIPTION OF THE INVENTION

In accordance with the objects of the invention set forth in the Summary of the Invention, the programmable microprocessing logic unit provides capability to perform a number of useful bit manipulation and Boolean logic functions on the processing system's data and address busses.

In the first case, a solution is provided to a problem presented by in-place execution of discrete Fourier transforms ("DFT") in digital signal processing. The inventive system provides a hardware resource to actively re-map the data memory to make sequential data memory constructs appear to be non-sequential bit-reversed memory constructs and vice versa, from the perspective of software accesses. Software may dynamically change the re-mapping operation as algorithms require throughout the operation of the system.

Figure 1:
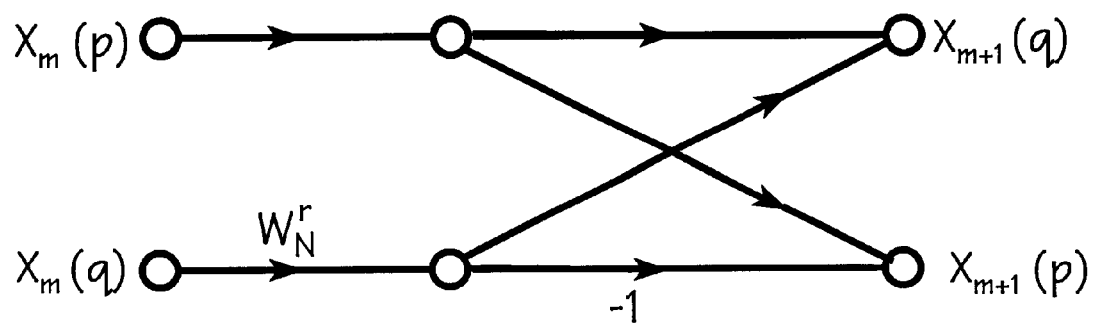
FIG. 1 shows a flow graph of a simplified butterfly computation commonly used in DSP discrete transform algorithms.
Figure 2:
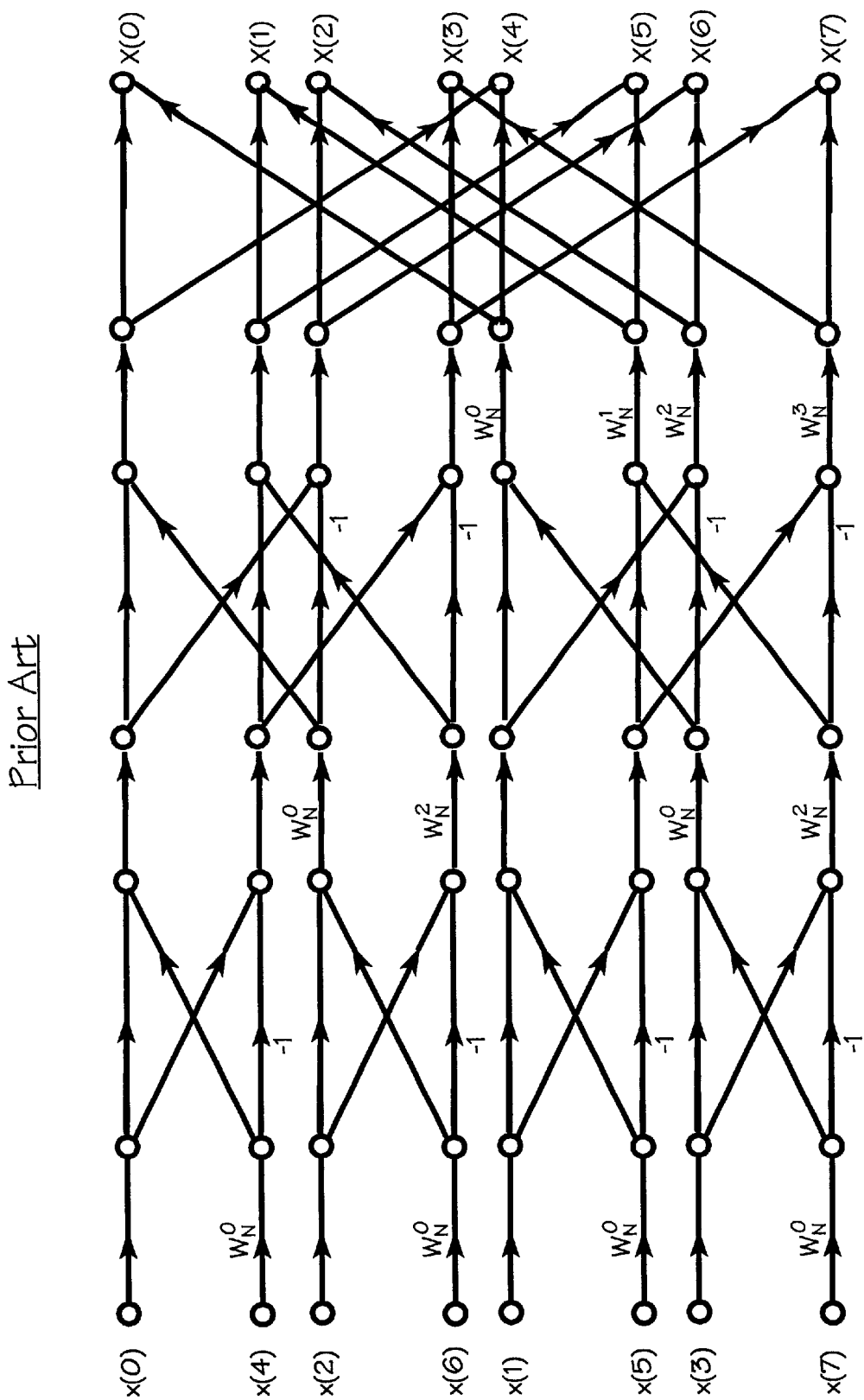
FIG. 2 depicts a flow graph for a typical eight-point discrete Fourier transform using butterfly computations such as the computation shown in FIG. 1. Both computations are presented for further understanding of the invention and are well known within the art.
Figure 3:
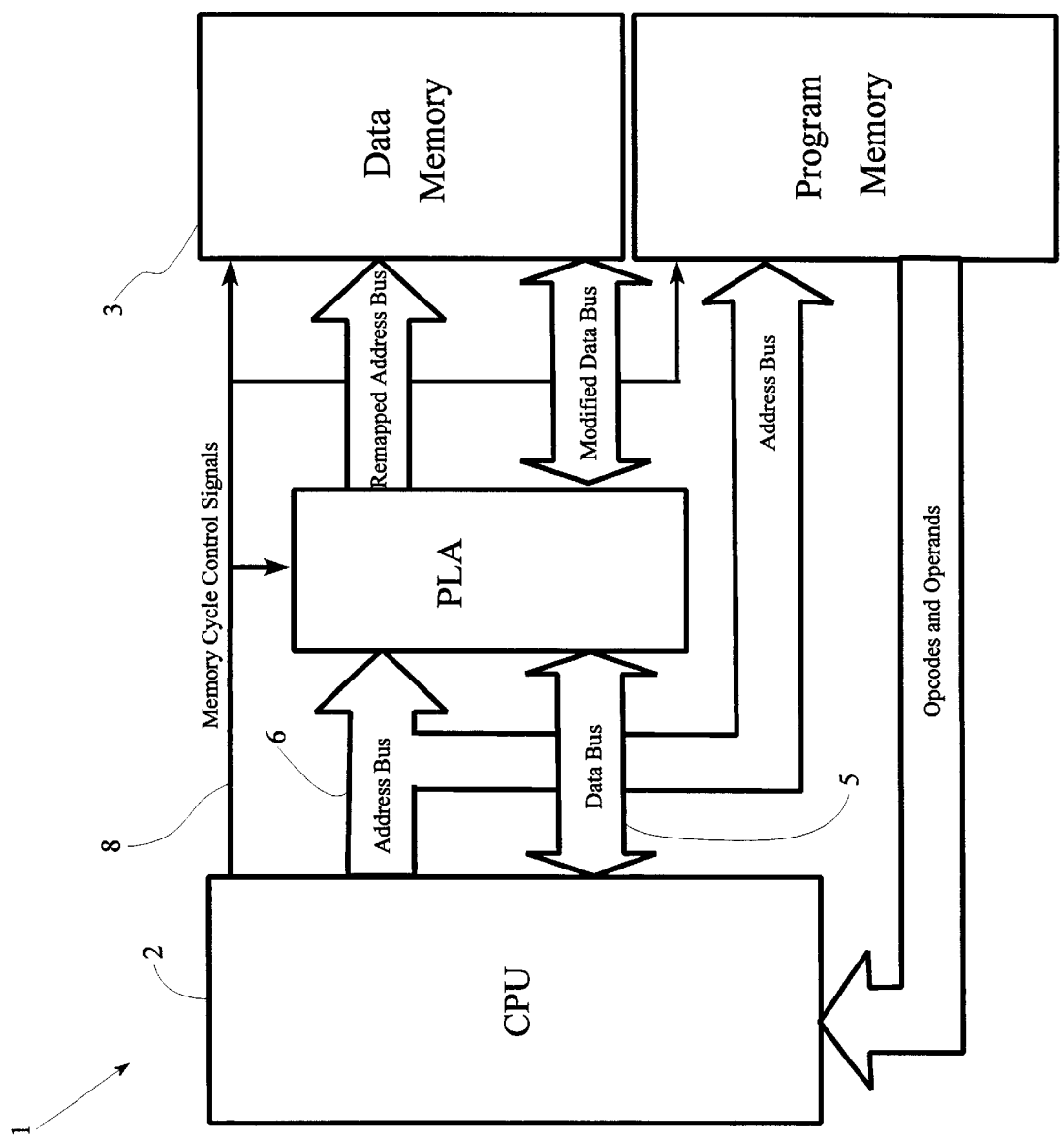
FIG. 3 shows a functional block diagram of the inventive digital signal processing system with a CPU, an address remapping and data manipulation PLA, and data and program memories.

In FIG. 3, the inventive system (1) is shown as having a central processing unit (2), or "CPU", interconnected to a data memory (3) via an address bus (6), data bus (5), and set of memory control signals (8). The data bus (5) is bi-directional, and used to carry data from the data memory (3) to the CPU (2) during CPU read cycles, and to carry data from the CPU (2) to the data memory (3) during write cycles. The memory cycle control signals (8) typically include a write enable signal which controls the timing of a CPU write cycle, and a read enable signal which controls the timing of a CPU read cycle. These methods of interconnection and interoperation of processors and data memory are well known within the art.

The inventive system employs a programmable logic array ("PLA") along the CPU address bus (6) to perform a re-mapping operation, and to create a modified, remapped address bus (7) for the data memory. In the preferred system embodiment, the PLA is a random access memory ("RAM") based PLA well known within the art, such as a Xilinx 5000 series Field Programmable Gate Array ("FPGA"), with appropriate FPGA logic firmware to perform conditional remapping of the address bus. FPGA logic firmware for such a device can be designed using a variety of well known methodologies, including Very High-level Design Language ("VHDL"), circuit diagrams, state diagrams, or Boolean logic equations. A compiler tool is used to reduce the VHDL, circuit diagrams, state diagrams or Boolean logic equations to a binary fuse map which is then loaded into the FPGA to enable the FPGA to perform the appropriate logic functions.

In the preferred system embodiment, a set of Boolean logic equations are developed concurrently with each DSP algorithm which requires the PLA to perform bit reversing operations. For example, the following Boolean logic equations would be appropriate for an eight-point discrete Fourier transform ("DFT") algorithm to re-map the output data as the algorithm outputs the data from the CPU in non-sequential, bit reversed order:

$$\text{remap\_address}[15:0] = (\text{address}[15:0] \cdot \text{read}) + (\text{address}[0:15] \cdot \text{write})$$

This equation creates a 16-bit re-mapped address bus only during write cycles, but does not remap the address bus during read cycles, thereby causing data non-sequentially output by the CPU during the algorithm to be actually stored in data memory in a sequential fashion, which is useful for DFT algorithms that employ decimation-in-frequency ("DIF") decomposition, as described in the Background of the Invention.

In the syntax of the above given Boolean equation, a dot operator "." performs a logical AND function, a plus "+" operator performs a logical OR operation, and square brackets cause multiple signals to be operated on by the equation in the sequence of the declaration within the brackets. When the "read" signal is true, the output address bus bits remap_address(2), remap_address(1), and remap_address(0) are assigned the binary values of address(2), address(1), and address(0), respectively. This causes no re-mapping operation to occur on read, or input, operations of the algorithm. When the "write" signal is true, the output address bus bits remap_address(2), remap_address(1), and remap_address(0) are assigned the binary values of address(0), address(1), and address(2), respectively, which causes a bit reversal on the address bus. When the algorithm outputs, or writes, data to the data memory non-sequentially, the data will actually be stored in a sequential fashion in the data memory due to the re-mapping operation.

In the preferred system embodiment, the operation of the PLA is further enhanced by allowing different re-mapping operation logic for different areas or blocks of memory address space. The following equation shows a re-mapping logic equation which appropriately re-maps memory at memory addresses above hex value 8 for a DFT employing decimation-in-time decomposition ("DIT"), and re-maps memory for a DFT which uses decimation-in-frequency ("DIF") decomposition for memory address at or below hex value 7:

$$\text{remap\_address}[3:0] = (((\text{address}[3:0] \cdot \text{read}) + (\text{address}[3,0,1,2] \cdot \text{write})) \cdot \text{address}[3:0] \leq h'7) + (((\text{address}[3,0,1,2] \cdot \text{read}) + (\text{address}[2:0] \cdot \text{write})) \cdot \text{address}[2:0] \geq h'8)$$

Using this enhanced equation, write operations to data memory addresses less than or equal to hex 7 are bit reversed for the three lower order address bits; read operations to addresses below hex 7 are unmodified; write operations to memory addresses at or above hex 8 are unmodified; and read operations from memory addresses at or above hex 8 are bit reversed for the three lower order address bits. Consequently, the DIT DFT algorithm would use the upper half of memory space, and the DIF DFT algorithm would use the lower half of the memory space.

Using techniques and tools well known within the art, the above equations could be compiled and reduced to a binary fuse map for a specific PLA device, incorporated into the DSP algorithms as a data segment within the software, and programmed into the PLA on demand by the algorithm to dynamically enable and alter the re-mapping operation of the PLA.

This first case presented the use of a dynamically reconfigurable bit reversing apparatus and method when selectively applied to an address bus for data memory. However, bit reversing is a subset operation of bit swapping, and when performed on segments or on groups of bits, it is a subset of segment or digit swapping.

In a more generalized case, the bit swapping hardware as described in the first case and be modified to be useful in a broader set of operations. FIG. 3 also shows the PLA applied to the data bus for bitwise manipulations of the data values as well as the address values, using the same methodology described supra.

Figure 4:
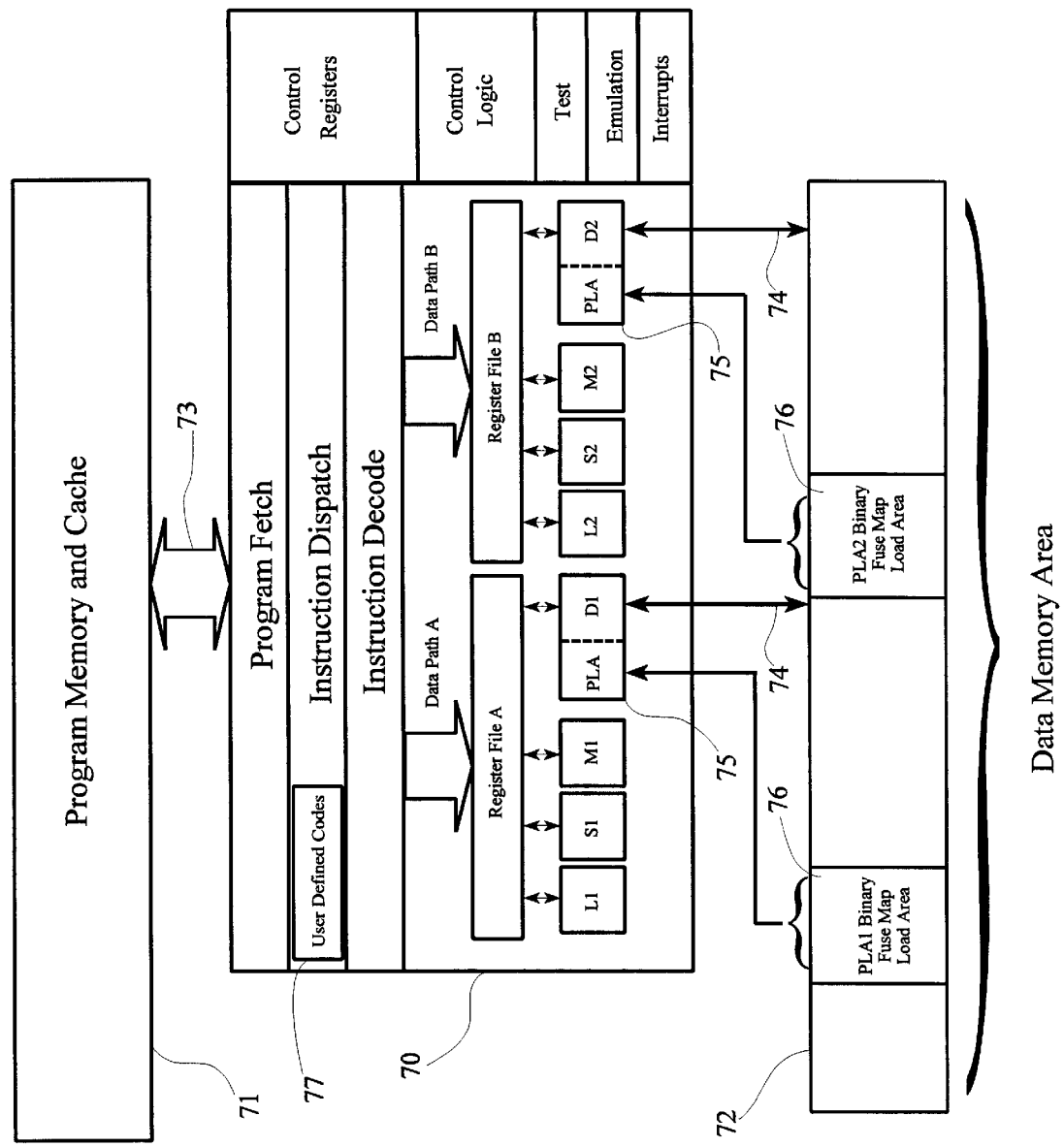
FIG. 4 illustrates the improved CPU architecture of a Texas Instruments TMS320C6x DSP, and FIG. 5 sets forth the improved CPU of FIG. 4 in more detail.

Turning to FIG. 4, a preferred embodiment is disclosed which is based on a Texas Instruments TMS320C6x Digital Signal Processor. The TI 'C6x DSP is organized as a CPU (70), program memory (71), and data memory (72). The CPU (70) includes two internal data paths for processing data in parallel, each data path having four arithmetic and logic units ("ALU"). In the TMS320C6x, each of the ALUs has some capability of pre-defined Boolean operations, multiplication, shifting, and addition. One of the ALUs, the D-unit (shown as D1 and D2) can calculate address values to be applied to the data memory (72). As program opcodes and operands are fetched into the CPU (73), the instructions are dispatched to the data path and ALU appropriately, and then decoded for execution. Each data path has a set of registers, or a register file, in which temporary data is stored. Each ALU operates on one or two values from the register file, and stores its result into the register file. The CPU can also execute STORE instructions, which cause data from the register file to be written into the data memory (72). Likewise, the CPU can execute LOAD instructions, which cause data to be read from the data memory (72) and placed into a register file. The architecture of the TMS320C6x DSP is prior art and well known within the art.

Figure 5:
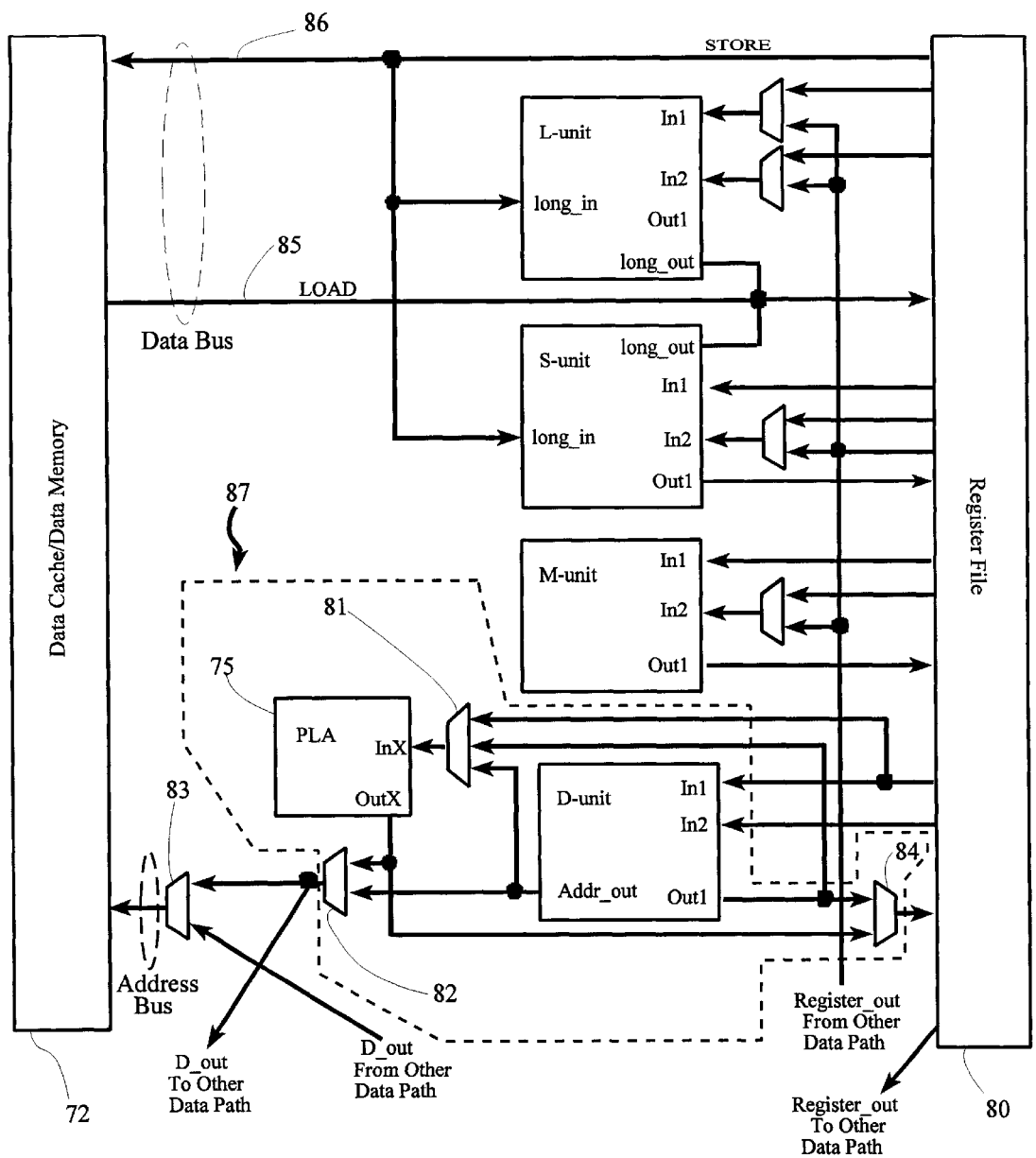

FIG. 5 shows a detailed view of one of the TMS320C6x data path register files (80), its ALUs, and data memory area (72). Each ALU in the prior art CPU has two inputs from the register file (80) and one output to the register file (80). Some of the inputs to an ALU are provided with a one-of-two data selector to allow data from the other data path's register file to be used in the operation within the ALU. The D-unit ALU is especially designed to allow it to operate on and generate address values for the data memory area (72). The description of FIG. 5 thus far follows the prior art TMS320C6x DSP.

To implement the invention using a TMS320C6x DSP, the CPU (70) and data memory (72) are improved and modified to include a programmable logic array (75) in the D-unit in each data path. The CPU can configure the PLA binary fuse map by retrieving data from the program memory (71), where it was stored as program data segments, and writing it to memory mapped areas within the data memory area (72) using STORE instructions. Electrically, the fuse map storage area is overlaid on top of the PLA logic gates. The instruction dispatch section of the CPU (70) is modified to define a new set of opcodes to be associated with the PLA equations. These may be a range of previously unused opcodes within the DSP instruction set, or may be individual unused opcodes.

The PLA (75) has a single input, InX, and a single output, OutX. The PLA (75) is provided with a one-of-three data selector on its input InX to allow the PLA to perform it's Boolean operation on data directly from the register file, directly from the D-unit output Out_1, or directly from the D-unit address output Addr_out. The PLA output OutX and D-unit output Addr_out are input to an address bus data selector (82). The output of the address data selector (82) is routed to the cross channel to the other data path, and to a final address data selector (83) for multiplexing with the cross channel from the other data path. Address values are applied to the data memory (72) according to the choice made at the final address selector (83).

The results of the PLA operation can be stored back into the register file, or the results of the D-unit operation may be stored to the register file, depending on the configuration of the output multiplexer (84).

The PLA (75) is thus interconnected to allow the following operations using its user-programmable Boolean equations without restricting or eliminating any of the prior art functions of the D-unit:

(1) Data directly from a data register can be input to the PLA, Boolean modified, and stored back into the data register file, to allow for any Boolean operation to be applied to any data in the register file such as bit inversions, bit and digit swapping, floating point packing, etc.;

(2) D-unit ALU results can be input to the PLA, Boolean modified, and stored back into the data register file, to allow the D-unit to be used to perform arithmetic operations on two data values from the register file followed by a Boolean operation in the PLA such as bit inversions, bit and digit swapping, etc.; and (3) D-unit address output values can be input to the PLA, Boolean modified and output to the data memory address bus, to accomplish auto-incremented indirect address generation using the D-unit ALU with Boolean modification, such as bit reversing, in the PLA to accomplish storing and loading of data to and from the data memory in linear and non-linear sequences as needed by algorithms such as DIT and DIF FFT.

The bit-reverse address operations would most naturally be used during a LOAD or STORE operation, such as:

LD.D1*MA12++[1],A8 wherein data is loaded from memory into register A8 using A12 as a data memory address pointer. The address pointer value is post-incremented, and then modified by the PLA (signified by M). In this case, the PLA has been programmed to perform a bit reversal. It is preferable for LOAD/STORE functions on the improved D-unit (87) to be controlled by four new modes selected by the mode field within LOAD and STORE operations (in addition to the prior art modes):

| Mode Field | Syntax | PLA Modification Performed |
| --- | --- | --- |
| 0 0 1 0 | *MR++[offsetR] | post-increment with PLA modification using register offset |
| 0 0 1 1 | *MR--[offsetR] | post-decrement with PLA modification using register offset |
| 0 1 1 0 | *MR++[ucst5] | post-increment with PLA modification using constant offset |
| 0 1 1 1 | *MR--[ucst5] | post-decrement with PLA modification using constant offset |

For LOAD and STORE operations, one of N PLA equations may be selected by bit in the one of the CPU control registers. By defining new modes for LOAD/STORE D-unit operations, the prior art opcode for D-unit LOAD/STORE operations can be used in conjunction with and without the PLA Boolean operation.

However, for arithmetic and logical operations on the D-unit, it is desirable to allow software to select different PLA operations to be performed on a per-instruction basis. By using opcodes which are otherwise unused in the prior art TMS320C6x opcode map, a new opcode which defines a source register for data, a destination register data for the results, and an equation index to select one of many PLA equations is very useful, such as the following opcode format:

| Bits Used | Field Length | Field Description |
|---|---|---|
| 31:29 | 3 bits | conditional register (creg) |
| 28 | 1 bit | test for equality with zero or non-zero (z) |
| 27:23 | 5 bits | destination register number (dst and OutX) |
| 22:18 | 5 bits | second source register number (src2) |
| 17:13 | 5 bits | first source register (src1 and InX) |
| 12:7 | 6 bits | PLA equation number (eqn) |
| 6:2 | 5 bits | opcode identifier = b'11100 (op) |
| 1 | 1 bit | data path (side) selector (s) |
| 0 | 1 bit | parallelism enable (p) |

The preceding disclosed opcode format mimics the format of the prior art D-unit opcodes for the "p", "s", "op", "src1", "src2", "dst", "z", and "creg" opcode fields, but adds the definition of the PLA input InX, PLA output OutX and PLA equation "eqn" fields. During runtime, the opcode is dispatched to the PLA-improved D-unit due to the "op" identifier value, and PLA receives the equation number from the "eqn" field to determine what Boolean operation to perform, what register number to use for input to the equation "src1/InX", and what register to output the results to "dst/OutX".

It will be understood by those skilled in the relevant arts of Digital Signal Processing, embedded processor design, and programmable logic design, that variations and alterations to the disclosed preferred embodiment would not depart from the spirit and scope of the invention. For example, the PLA could be incorporated within a DSP device itself, or it could be a discrete component residing on a circuit board assembly with a DSP or general purpose microprocessor. Likewise, the PLA could be a static logic PLA, using ultra-violet erasable programmable read-only memory ("UVEPROM") or electrically-alterable erasable programmable read-only memory ("EEPROM") to store the binary fuse map incorporating the remapping logic.

We claim:

1. A processing system with a programmable logic unit, comprising:
   a digital signal processing means for executing algorithmic software, said processing means having an address bus for specifying a data memory address to access, a data bus for reading and writing data, and one or more memory cycle control signals for controlling the timing of processing unit read and write cycles;
   a data memory means for storing algorithm input and output data, said memory means having a plurality of data memory locations for storing said algorithm input and output data, and having a first memory address bus input for selecting a data memory location to be accessed, a first data bus terminal for receiving and outputting data from a selected data memory location, and a first set of memory cycle control inputs electrically connected to said memory cycle control signals of the processing means;
   a programmable logic array ("PLA") which is reconfigurable by said processor algorithms, said PLA having a second address bus input electrically connected to said processing means address bus, said PLA also having a second set of memory cycle control inputs electrically connected to said memory cycle control signals of the processing means, said PLA having a remapped memory bus output electrically connected to said data memory means first address bus input, said PLA having a second data bus terminal electrically connected to said processor data bus for receiving and outputting data and PLA configuration, said PLA also having a third data bus terminal for communicating modified data values to said first data bus terminal of said data memory means, and said PLA incorporating suitable Boolean logic for selectively performing Boolean logic modifications on address and data values received from said processing means address bus and data bus, said PLA presenting the modified address and data values to said data memory means via said remapped address bus and modified data bus outputs to said first address bus input and first data bus on said data memory means, respectively; and
   a program disposed in said PLA causing said PLA to perform an address bus bit-reversal operation suitable for resequencing of data for decimation in time fast Fourier transform algorithms.

2. A processing system with a programmable logic unit, comprising:
   a digital signal processing means for executing algorithmic software, said processing means having an address bus for specifying a data memory address to access, a data bus for reading and writing data, and one or more memory cycle control signals for controlling the timing of processing unit read and write cycles;
   a data memory means for storing algorithm input and output data, said memory means having a plurality of data memory locations for storing said algorithm input and output data, and having a first memory address bus input for selecting a data memory location to be accessed, a first data bus terminal for receiving and outputting data from a selected data memory location, and a first set of memory cycle control inputs electrically connected to said memory cycle control signals of the processing means;
   a programmable logic array ("PLA") which is reconfigurable by said processor algorithms, said PLA having a second address bus input electrically connected to said processing means address bus, said PLA also having a second set of memory cycle control inputs electrically connected to said memory cycle control signals of the processing means, said PLA having a remapped memory bus output electrically connected to said data memory means first address bus input, said PLA having a second data bus terminal electrically connected to said processor data bus for receiving and outputting data and PLA configuration, said PLA also having a third data bus terminal for communicating modified data values to said first data bus terminal of said data memory means, and said PLA incorporating suitable Boolean logic for selectively performing Boolean logic modifications on address and data values received from said processing means address bus and data bus, said PLA presenting the modified address and data values to said data memory means via said remapped address bus and modified data bus outputs to said first address bus input and first data bus on said data memory means, respectively; and
   a program disposed in said PLA causing said PLA to perform an address bus bit-reversal operation suitable for resequencing of data for decimation in frequency fast Fourier transform algorithms.

3. A processing system with a programmable logic unit, comprising:
   a processing means for executing algorithmic software, said processing means having an address bus for specifying a data memory address to access, a data bus for reading and writing data, and one or more memory cycle control signals for controlling the timing of processing unit read and write cycles;

a data memory means for storing algorithm input and output data, said memory means having a plurality of data memory locations for storing said algorithm input and output data, and having a first memory address bus input for selecting a data memory location to be accessed, a first data bus terminal for receiving and outputting data from a selected data memory location, and a first set of memory cycle control inputs electrically connected to said memory cycle control signals of the processing means;

a programmable logic array ("PLA") which is reconfigurable by said processor algorithms, said PLA having a second address bus input electrically connected to said processing means address bus, said PLA also having a second set of memory cycle control inputs electrically connected to said memory cycle control signals of the processing means, said PLA having a remapped memory bus output electrically connected to said data memory means first address bus input, said PLA having a second data bus terminal electrically connected to said processor data bus for receiving and outputting data and PLA configuration, said PLA also having a third data bus terminal for communicating modified data values to said first data bus terminal of said data memory means, and said PLA incorporating suitable Boolean logic for selectively performing Boolean logic modifications on address and data values received from said processing means address bus and data bus, said PLA presenting the modified address and data values to said data memory means via said remapped address bus and modified data bus outputs to said first address bus input and first data bus on said data memory means, respectively; and a program disposed in said PLA causing said PLA to perform a compacting of separate mantissa, exponent, and sign data values into a single, concatenated data value using bit field extraction and concatenation logic.

* * * * *